United States Patent
Bergström et al.

(10) Patent No.: US 10,256,893 B2
(45) Date of Patent: Apr. 9, 2019

(54) MOBILITY-HANDLING ASPECTS OF USER EQUIPMENT BEAMFORMING

(71) Applicant: TELEFONAKTIEBOLAGET L M ERICSSON (PUBL), Stockholm (SE)

(72) Inventors: Andreas Bergström, Linköping (SE); Niclas Wiberg, Linköping (SE); Håkan Andersson, Linköping (SE); Johan Furuskog, Stockholm (SE); Mattias Frenne, Uppsala (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/770,420

(22) PCT Filed: Oct. 21, 2016

(86) PCT No.: PCT/IB2016/056354
§ 371 (c)(1),
(2) Date: Apr. 23, 2018

(87) PCT Pub. No.: WO2017/068547
PCT Pub. Date: Apr. 27, 2017

(65) Prior Publication Data
US 2018/0323858 A1    Nov. 8, 2018

Related U.S. Application Data

(60) Provisional application No. 62/244,490, filed on Oct. 21, 2015.

(51) Int. Cl.
| | |
|---|---|
| *H04B 7/06* | (2006.01) |
| *H04B 7/08* | (2006.01) |
| *H04B 7/0404* | (2017.01) |

(52) U.S. Cl.
CPC ......... *H04B 7/0857* (2013.01); *H04B 7/0404* (2013.01); *H04B 7/0617* (2013.01);
(Continued)

(58) Field of Classification Search
CPC ......... H04L 2025/03426; H04L 1/0054; H04L 25/067; H04L 27/38
See application file for complete search history.

(56) References Cited

U.S. PATENT DOCUMENTS

| | | |
|---|---|---|
| 2013/0072243 A1 | 3/2013 | Yu et al. |
| 2013/0215844 A1 | 8/2013 | Seol et al. |

(Continued)

FOREIGN PATENT DOCUMENTS

EP      2562941 B1     3/2018

*Primary Examiner* — Shuwang Liu
*Assistant Examiner* — Gina M McKie

(57) ABSTRACT

Embodiments described herein are directed to methods for controlling user equipment (UE) beamforming in a wireless network. According to certain embodiments, a (UE) can receive one or more beam reference signals included in a restricted set of useable beam reference signals for adjusting the UE beamforming. Further, the UE can receive one or more beam reference signals outside of the restricted set. It can be determined whether to update the restricted set to include a subset of the one or more beam reference signals outside of the restricted set, based on predetermined criteria. The UE beamforming can be adjusted based on beam reference signals in the restricted set.

28 Claims, 7 Drawing Sheets

(52) U.S. Cl.
CPC ......... *H04B 7/0623* (2013.01); *H04B 7/0695* (2013.01); *H04B 7/088* (2013.01)

(56) References Cited

U.S. PATENT DOCUMENTS

| | | | |
|---|---|---|---|
| 2015/0257073 A1* | 9/2015 | Park | H04B 7/0408 370/331 |
| 2017/0033916 A1* | 2/2017 | Stirling-Gallacher | H04L 5/1438 |
| 2018/0020363 A1* | 1/2018 | Faxer | H04L 5/005 |
| 2018/0041319 A1* | 2/2018 | Cheng | H04L 5/0048 |
| 2018/0212651 A1* | 7/2018 | Li | H04B 7/0695 |

* cited by examiner

MOBILITY-HANDLING ASPECTS OF USER EQUIPMENT BEAMFORMING

CROSS-REFERENCE TO RELATED APPLICATIONS

This application is a national stage application of international application No. PCT/IB2016/056354, filed Oct. 21, 2016, which claims priority to U.S. Patent Application No. 62/244,490 filed on Oct. 21, 2015, the disclosure of which are hereby incorporated by references in their entireties.

FIELD

Embodiments described herein relate to the field of wireless communication; and more specifically, to mobility-handling aspects of user equipment (UE) beamforming.

BACKGROUND

Beamforming

The first implementations of 5G base stations will most likely use so-called analog beamforming. This is due to the higher complexity, mostly from a hardware perspective, of implementing so-called digital beamforming. The latter imposes fewer functionality restrictions but is rather costlier to realize.

Beamforming refers to a transmitter amplifying the sent signals in a selected direction while weakening it in others, and correspondingly that the receiver can amplify signals from a selected direction while weakening unwanted signals from other directions. Analog beamforming means that this can only be applied to one direction at a time by each transmitter/receiver. An array of multiple transmit antennas or receive antennas have to be used to transmit or receive in multiple directions at a time. The same signal is transmitted from multiple transmit antennas, but with individually adjusted phase shifts, which effectively creates a beam in the resulting transmit radiation pattern of the signal. The beam direction depends on the phase shifts of the antenna elements. Similarly, the phase shifts can in the receive direction be used to steer the maximal antenna sensitivity toward a desired direction.

Beamforming allows the received signal to be stronger for an individual connection, thereby enhancing throughput and coverage for that connection. It also allows reducing the interference from unwanted signals, thereby enabling several simultaneous transmissions over multiple individual connections using the same time-frequency resource, so called multi-user multiple-input-multiple-output (MIMO).

Reference Signals

One important problem with beamforming is the decision of which beam(s) (i.e., which direction) to use for transmission and/or reception. To support base station beamforming a number of reference signals can be transmitted in different beam directions, respectively, from the base station, whereby the UE can measure these reference signals and report the measurement results to the base station. The base station can then use these measurements to decide which beam(s) to use for shared data transmission to one or more UEs. A network can use a combination of persistent and dynamic reference signals for this purpose, see further details below.

The persistent reference signals, called beam reference signals (BRS), are transmitted repeatedly in a large number of different beam directions. This allows a UE to measure the BRS when transmitted in different beams, without any special arrangement for that UE from the base station perspective. The UE reports the received powers for different BRS back to the base station plus the index of the BRS, given by e.g. the BRS sequence and the time and frequency position of the particular BRS. By reporting a BRS index and an associated received power of that BRS the UE is effectively reporting its preferred beam. The UE may report a list of BRS indices and associated powers, e.g. its top eight strongest BRSs.

The base station can then transmit dedicated reference signals to that UE, using one or more beams or beam directions that were reported as strong for that UE. These are dedicated reference signals and may thus only be present when the UE has data to receive, and they give more detailed feedback information of the beamformed channel, such as co-phasing information of the polarizations and the recommended transport block size. Since the BRS is transmitted repeatedly over a large number of beams, the repetition period has to be relatively long to avoid using too much resource overhead for the BRS transmissions.

The dynamic reference signals, called channel-state information reference signals (CSI-RS), are transmitted only when needed for a particular connection. The decision when and how to transmit the CSI-RS is made by the base station and signaled to the involved UEs using a so-called measurement grant. When the UE receives a measurement grant it measures on the corresponding CSI-RS. The base station can choose to transmit CSI-RS to a UE using only beam(s) that are known to be strong for that UE, to allow the UE to report more detailed information about those beams. Alternatively, the base station can choose to transmit CSI-RS also using beam(s) that are not known to be strong for that UE, for instance to enable fast detection of new beam(s) in case the UE is moving.

The 5G base stations transmit other reference signals as well. For instance, they transmit a so-called demodulation reference signal (DMRS) when transmitting control information or data to a UE. Such transmissions are typically made using beam(s) that are known to be strong for that UE.

In 4G systems, discovery reference signals (DRS) may be used for the same purpose as BRS, as described above. Hence, the LTE UE is configured to perform received power measurement on a set of different DRS signals and report the associated DRS index and measured power for the eight DRS measurements with highest power. Hence, the proposals in this IvD are equally well applicable to 4G.

UE Beamforming

Beamforming is not restricted to the base stations. It can also be implemented in the receiver of the UE, further enhancing the received signal and suppressing interfering signals. Likewise, the UE may use transmit beamforming. Similar to a base station, analog beamforming can be used in the UE, which means that the UE can only receive/transmit from/to one direction at a time, unless multiple receivers/transmitters are available.

When operating with the 5G base stations, a UE with analog receive beamforming can measure the BRS using different UE receive beams, and then choose the UE receive beam(s) that provides the highest BRSRP (Beam Reference Signal Received Power). However, care must be taken when comparing the RSRP of different receive beams since the power depends on the utilized combination of transmit and receive beams. A given receive beam may have a high BRSRP when paired with a certain transmit beam, but have a low BRSRP in combination with other transmit beams. A different receive beam may also give an equally high BRSRP when combined with a different transmit beam, but give a low BRSRP in combination with all other transmit beams.

Since the base station may not transmit all BRS at the same time (due to limitations imposed by analog beamforming, for example) but rather cycle through all transmit beams during some time window, it is important that BRSRP-values for different receive beams that are compared stem from measuring the same transmit beam, otherwise the measurements may not be comparable.

Problems with Existing Solutions

In the case where the UE chooses the preferred receive beam(s) based on the highest received BRS power, this may then present some difficulties in a mobility scenario when the UE can measure BRSs (in this context equivalent to beams) from not only the serving transmission point (TP), such as a base station, but also additional TPs. These additional TPs could be a base station other than the base station currently serving the UE. They could also be remote antenna(s) connected to the serving base station.

Both of these situations are illustrated in FIGS. 1a and 1b. FIG. 1a shows an example diagram of a UE 56 receiving beams from two distinct TP, in this case radio base stations (RBSs) (or base stations (BS)) 24. FIG. 1b shows an example diagram of UE 56 hearing two beams from multiple antennas belonging to a single TP, RBS 24.

Now, when the BRS measurements of beams originating from a non-serving TP become stronger than those from the serving TP, the UE will then adjust its UE receive beamforming based on this other TP. This new UE beamforming will result in an improved link quality and SINR from the non-serving TP whereas the link quality/SINR from the serving TP will, due to the change of UE beam direction away from the serving TP, consequently be decreased, which may be problematic.

The same problem occurs in the UE transmit beam selection if the UE transmit beam is adjusted based on the same BRS measurements as the UE receive beam. Hence, the UE transmit beam will be directed towards the non-serving TP, which may be problematic.

In case the changing of beam directions is rather slow, as could be expected in open-area propagation environments and/or during rather low mobility speeds, this should not be a major problem since the network will get continuous feedback on the received BRS powers from the UE. Hence, the network may take actions accordingly by, e.g., scheduling a transmission towards the UE from the other TP (i.e., changing the serving TP for the UE) rather from the serving TP and/or initiating a handover procedure of the UE towards the base station controlling the new TP.

There is, however, a risk that this sudden degradation in link-budget relative to the serving TP happens faster than what the network can be made aware of due to, e.g., high mobility speeds and/or a less stable propagation environment. Hence, there is a risk that the connection to the serving TP is lost before the NW has adapted to the new conditions, which may be problematic.

SUMMARY

Embodiments described herein are directed to methods for controlling beamforming in a wireless network. According to certain embodiments, a user equipment (UE) can receive one or more beam reference signals included in a restricted set of useable beam reference signals for adjusting the UE beamforming. Further, the UE can receive one or more beam reference signals outside of the restricted set. It can be determined whether to update the restricted set to include a subset of the one or more beam reference signals outside of the restricted set, based on predetermined criteria. The beamforming can be adjusted based on beam reference signals in the restricted set.

Another embodiment is directed to a UE for controlling beamforming in a wireless network. The UE can include a receiver configured to receive one or more beam reference signals included in a restricted set of useable beam reference signals for adjusting the UE beamforming, and to receive one or more beam reference signals outside of the restricted set. The UE can further include a processor configured to determine whether to update the restricted set to include a subset of the one or more beam reference signals outside of the restricted set, based on predetermined criteria. The UE can further include a transceiver configured to adjust the beamforming based on beam reference signals in the restricted set.

Yet another embodiment is directed to method for controlling UE beamforming in a wireless network. The method can include transmitting one or more beam reference signals included in a restricted set of useable beam reference signals for adjusting the UE beamforming. The method can further include transmitting one or more beam reference signals outside of the restricted set. The method can further include determining whether to update the restricted set to include a subset of the one or more beam reference signals outside of the restricted set, based on predetermined criteria. The method can further include causing the UE to adjust the beamforming based on beam reference signals in the restricted set.

Yet another embodiment is directed to a network node for controlling UE beamforming in a wireless network. The network node can include a receiver configured to receive a report message from the UE regarding one or more beam reference signals included in a restricted set of useable beam reference signals for adjusting the UE beamforming, and one or more beam reference signals outside of the restricted set. The node can include a network interface configured to receive a determination whether to update the restricted set to include a subset of the one or more beam reference signals outside of the restricted set, based on predetermined criteria. The node can further include a transmitter configured to transmit a signal indicating to the UE to update the restricted set and adjust the beamforming based on beam reference signals in the restricted set.

One of ordinary skill in the art would realize that various communication nodes (e.g., UE, eNodeB, or other station) could perform various processes described herein. Other features and advantages will become obvious to one of ordinary skill in the art in light of the following detailed description and drawings.

BRIEF DESCRIPTION OF THE DRAWINGS

The accompanying drawing figures incorporated in and forming a part of this specification illustrate several aspects of the disclosure, and together with the description serve to explain the principles of the disclosure.

DESCRIPTION OF EMBODIMENTS

Figure 1A:
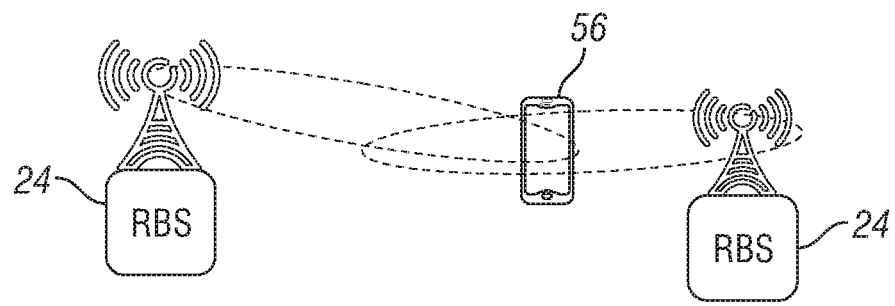
FIG. 1a is a diagram showing a user equipment hearing distinct beams from multiple radio base stations, according to an embodiment of the present disclosure.
Figure 1B:
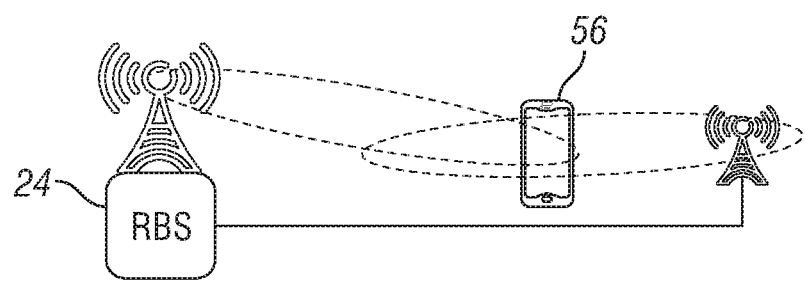
FIG. 1b is a diagram showing a user equipment hearing distinct beams from multiple antennas of a single radio base station, according to an embodiment of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Certain embodiments described herein are directed to limiting the freedom of the UE to change its receive (and/or transmit) beamforming by introducing an inertia in the UE beam-changing procedure. This can include restricting which BRS/Tx-beams the UE may use to adapt the UE beam on. For instance, by excluding certain beams or indicating an allowable set of beams. The methods may also include requiring an acknowledgement from the eNB before UE beam adaptation is allowed or the UE beam adaptation may only be allowable if the beam change is considered to be "minor", e.g., within a specified threshold. The allowed beam change may be quantified in terms of difference in BRSRP between Tx-beams under consideration, anticipated SINR change, or similar measure.

Embodiments described herein give, from a network perspective, a more predictable UE behavior with respect to UE beamforming. This minimizes the risk of sudden link SINR drop which could cause the connection towards the serving TP to be lost before the network has been able to react accordingly. According to various embodiments, the UE can maintain a connection toward the serving base station sufficiently long so that mobility procedures have time to complete, e.g., a new TP selection or base station handover.

Limiting BRSs Allowed for UE Beamforming

Figure 2A:
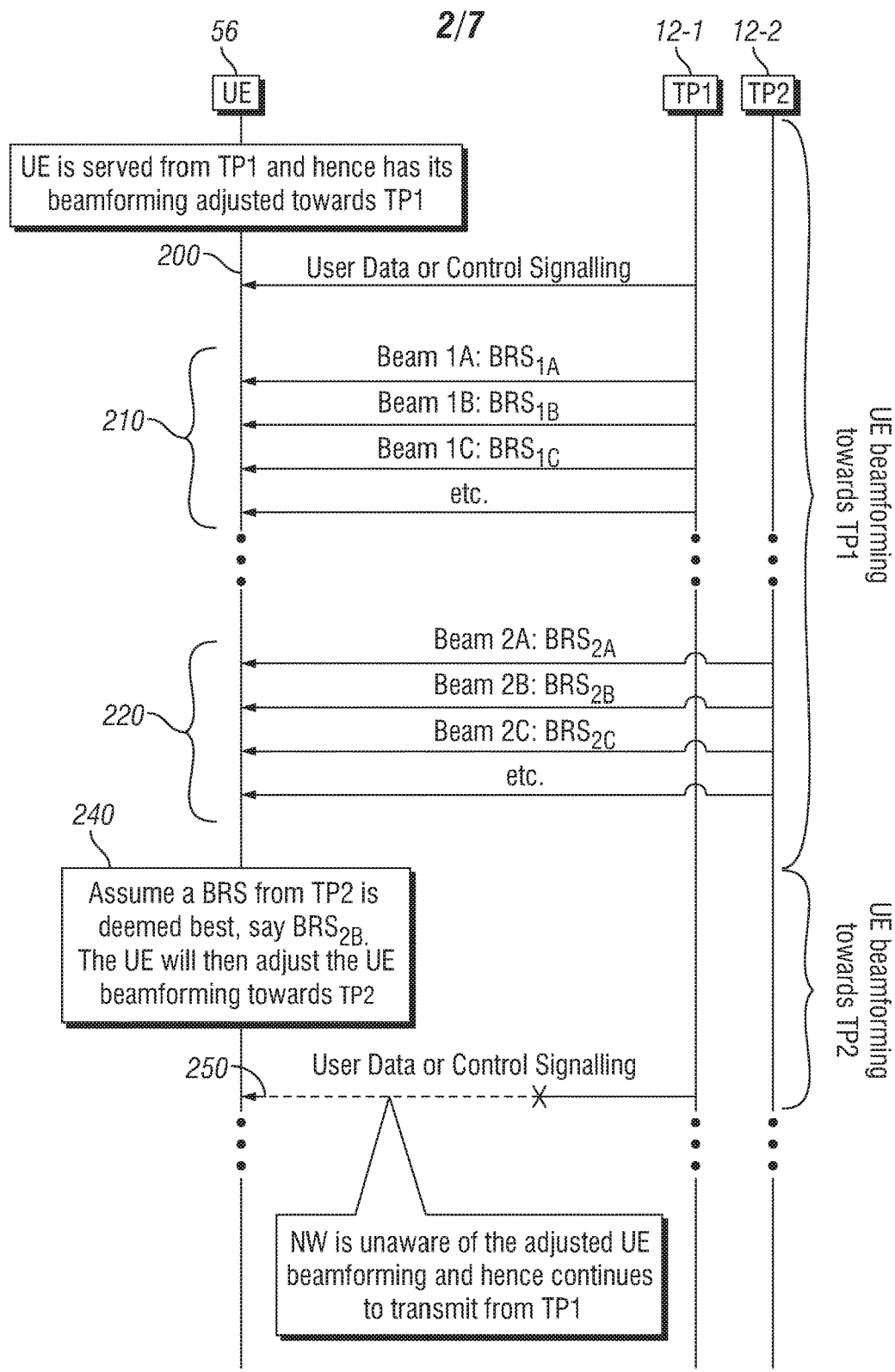
FIG. 2a is a flow diagram illustrating an embodiment where the user equipment adjusts the user equipment beamforming, according to various embodiments.
Figure 3:
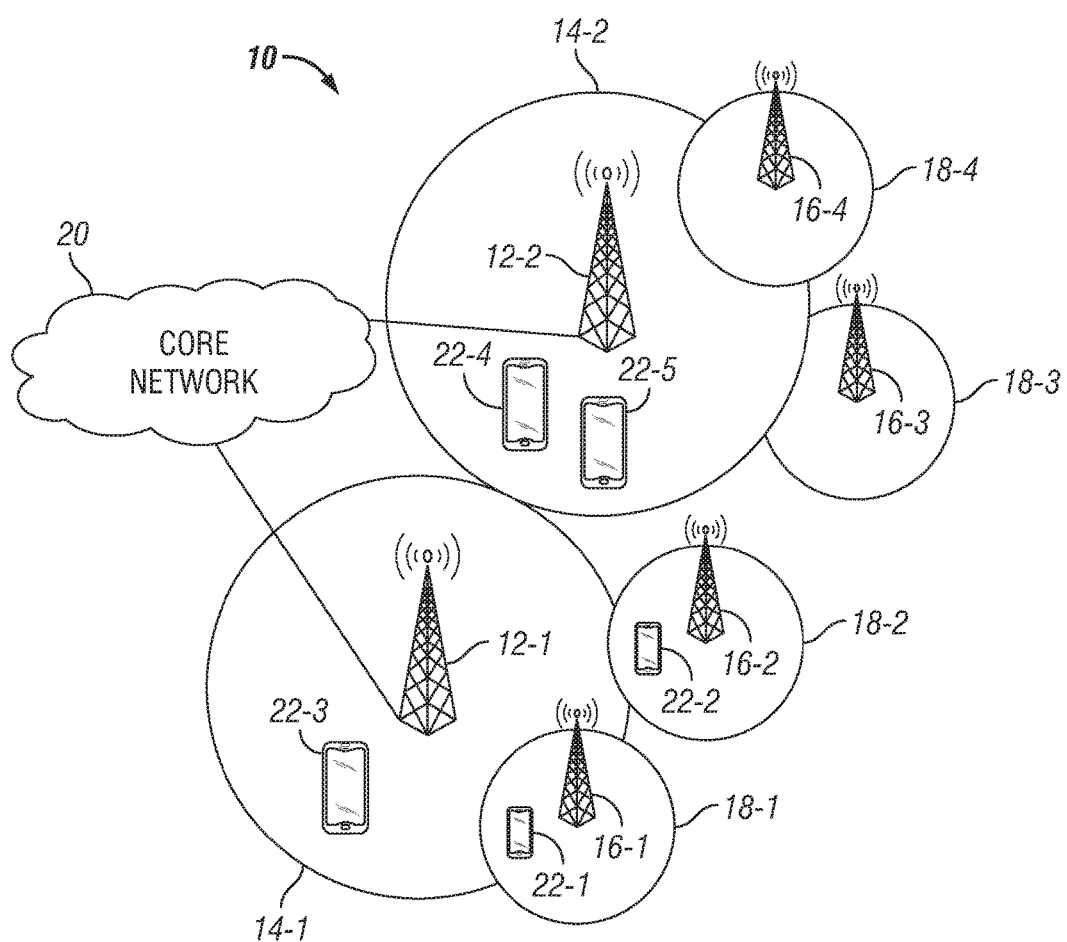
FIG. 3 illustrates one example of a cellular communications network according to some embodiments of the present disclosure.

As shown in FIG. 2a, UE 56 can be served by transmission point TP1 (e.g., a base station 12-1, as shown in FIG. 3 described below), but can receive BRSs from another TP. According to one example, base station 12-1 may be an eNodeB (eNB), or any other network node. In this example, it is assumed that UE 56 already has its beamforming adjusted towards TP1, and receives user data and/or control signaling therefrom, at step 200. UE 56 can receive $BRS_{1A}$, $BRS_{1B}$, $BRS_{1C}$, etc. from TP1, at step 210. Moreover, UE 56 may receive additional BRSs from TP2 (e.g., base station 12-2, as shown in FIG. 3, according to the present exemplary embodiment), at step 220.

At step 240, UE 56 may determine that a BRS from TP2, received at step 220, is deemed best. That is, UE 56 may take a BRSRP measurement at a predetermined time, at which $BRS_{2B}$, for example, is the most powerful. Thus, UE 56 may automatically adjust its beamforming to TP2. However, if the network (e.g., any radio access node, including a baseband unit (BBU) or a cloud RAN (CRAN)) is unaware of the adjusted UE beamforming, the transmissions of user data and/or control signaling may continue to be transmitted from TP1, which can result in UE 56 not receiving the user data or control signaling. Although various network nodes could perform the functions herein, alone or in combination, this document will refer to the "network" or "(NW)" for the sake of simplicity.

Figure 2B:
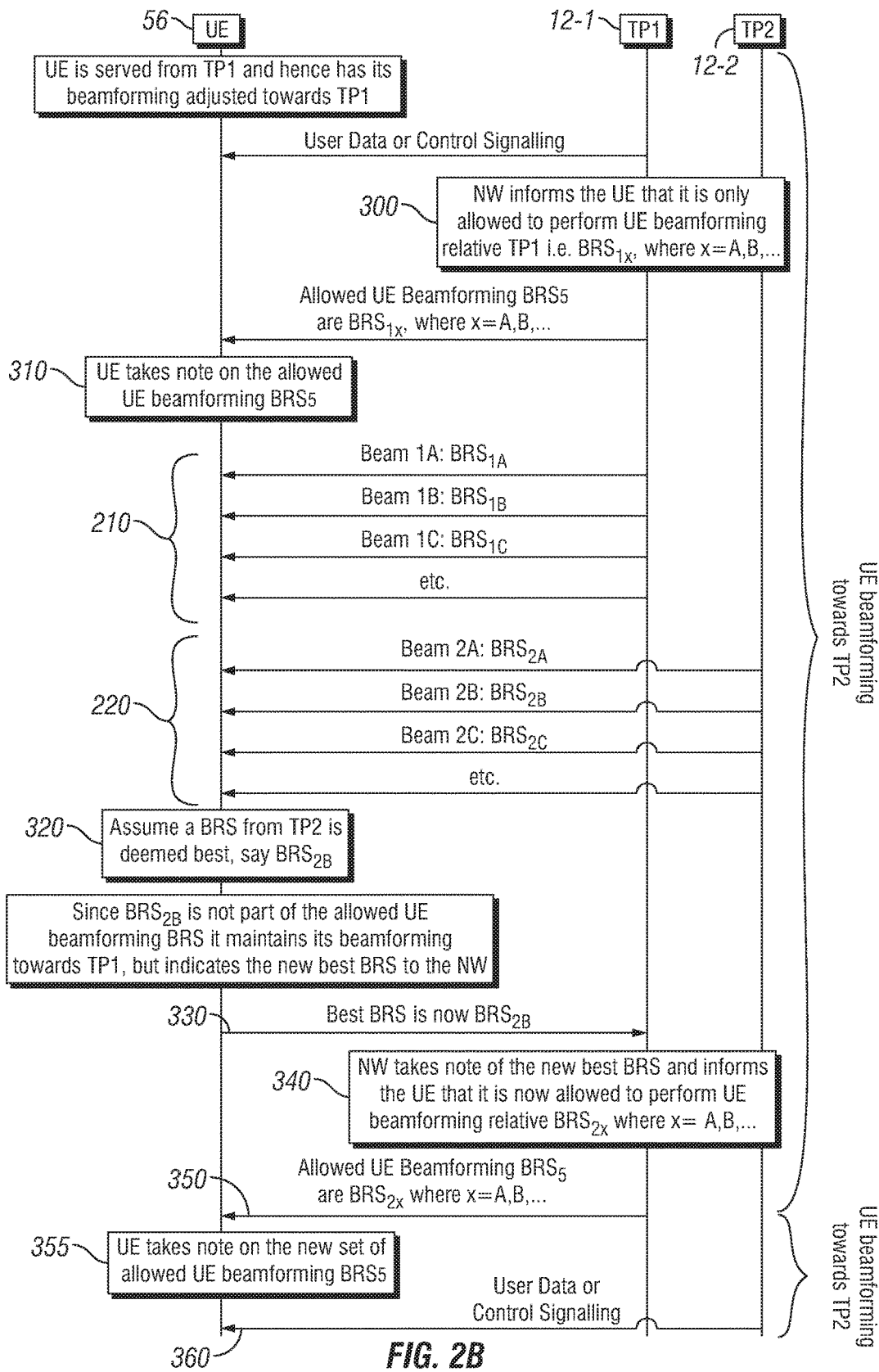
FIG. 2b is a flow diagram illustrating modes of adjusting the user equipment beamforming, according to various embodiments.

In some embodiments described herein, as depicted in FIG. 2b for example, the NW can explicitly signal to the UE 56 which BRSs that the UE 56 may use for adjusting the UE beamforming. As an example shown in step 300 of FIG. 2b, the explicitly signaled BRSs could be all BRSs that are allocated to the currently serving TP1, for example. Accordingly, the UE can adjust beamforming for transmission and/or reception towards BRS in a restricted set, including $BRS_{1A}$, $BRS_{1B}$, $BRS_{1C}$, etc., as step 310.

However, according to certain embodiments, the UE 56 may periodically perform BRSRP measurements on various BRSs from one or more other TPs (TP2, for example, in FIG. 2b). In this case, UE 56 can report a list of the highest measured BRSRP measurements and associated BRS indices from an unrestricted set of BRS indices. In the current example, all of the BRSs from TP2 are part of the unrestricted set, as the NW previously informed UE 56 that it is only allowed to perform UE beamforming relative to TP1. In other words, only the BRSs from TP1 were part of the restricted set.

At step 320, UE 56 determines that $BRS_{2B}$ has the strongest BRSRP; however, since $BRS_{2B}$ is not part of the restricted set, UE 56 maintains its beamforming towards TP1 as explicitly instructed. The unrestricted set of BRSs (e.g., $BRS_{2B}$ in this example) determined based on the BRSRP measurements may be useful for the NW to initiate handover procedures and to perform downlink beam selection, according to certain embodiments. Thus, at step 330 UE 56 indicates the best BRSs (even as part of an unrestricted set) to the NW, according to one exemplary embodiment.

UE 56 can send a report message regarding the BRSRP to the NW, which may include a particular subset of BRSs within the unrestricted set of BRSs (e.g., BRSs from TP2 in this example). Thereafter, the NW can indicate to the UE that it should use the BRS from that subset of the unrestricted set for its beamforming, according to various embodiments, due to the desirable reported BRSRP, as determined by the NW. The message sent from UE 56 can be part of the BRSRP report at step 330, for example, or with any other transmission. At step 340, the NW can determine that the subset of the unrestricted set of BRSs is allowed to be used by UE 56, if certain predefined criteria are met, for example. In this embodiment, the exemplary predefined criteria could be a BRSRP above a predetermined level. One of ordinary skill in the art would realize that various other criteria could be used by the NW to determine whether a particular subset of BRSs would be desirable for UE 56 to use for beamforming.

At step 350 the NW sends a message to UE 56 indicating that BRSs from TP2 are approved and should be included in the restricted set. UE 56 updates the restricted set accordingly at step 355. Since it was determined based on the BRSRP that BRSs from TP2 are the most desirable, UE 56 adjusts its beamforming towards TP2, as its BRSs are now part of the updated restricted set. Accordingly, user data and/or control signaling is the received at UE 56 from TP2 at step 360.

In some embodiments, UE 56 is explicitly informed which BRSs that are not allowed to be used for UE beamforming adjustment. As an example, this could be known interferers towards which it is not desirable for UE 56 to adjust its beamforming. These could also be BRSs belonging to TPs that are already loaded up to a predetermined threshold, for which additional traffic is not desirable, thereby achieving TP-specific load balancing.

In some embodiments, UE 56 is explicitly informed which BRSs are highly loaded, i.e., that have interference due to transmissions aimed for other users, for example. UE 56 will thus avoid adjusting UE 56 transmission and/or reception beams for this particular BRS, even though the BRSRP may be relatively high as compared to other BRSs. In this instance, the interference is compared to a known, predetermined threshold, and if the interference is above the threshold, then the UE 56 will be instructed to avoid the beams for that BRS. Thereby, beam-specific load balancing can be achieved. UE 56 is thus also given information from the NW via the serving TP, for example, that can be used to actively suppress those beams in the receiver.

Limiting the Autonomy of UE Beamforming

In some embodiments, the UE is allowed to perform autonomous UE beamforming updates if involving only the BRSs for a given restricted set of BRSs as, e.g., discussed in the embodiments of the previous section. Beamforming involving other BRSs outside the restricted set (or belonging to another subset of BRSs) can require the UE to get an acknowledgement from the NW before updating the UE beamforming. The UE can then send a beamforming update request to the network and the network will respond with a message indicating whether it is accepted or not. The UE beam update request may be explicit in the form of a random-access signal transmitted from the UE to the NW. The UE beam update request may alternatively be part of a BRSRP report to the NW.

In some embodiments, the UE is allowed to perform autonomous UE beamforming updates only as long as the received power of the set of considered BRSs does not vary more than a given, predetermined amount, i.e., relative to the BRS with the highest BRSRP. This amount could be a value provided by the NW, according to various embodiments. For example, this could be one value for all BRSs, one value per set of BRSs (as discussed above), or even one unique value per BRS. In other cases, the UE can be required to get an acknowledgement from the NW before updating the UE beamforming.

In an alternative embodiment, the UE can be allowed to only use the latest reported strongest BRS (i.e., highest BRSRP) for UE beam selection. During the time until the next BRSRP report, the UE may not be allowed to change the reference for UE beam selection even though the UE has found a stronger beam in the period between two BRSRP reporting instances.

In some embodiments, the UE is only allowed to perform autonomous beamforming updates based on scheduled measurements on CSI-RS. This implicitly limits the adjustment since the network controls on which beams the UE measures.

Limiting the Speed of UE Beamforming Adjustments

In some embodiments, the UE is allowed to do only "minor" adjustments to the UE beamforming whereas "larger" changes need to be approved by the NW. The definition of what is "minor" and "larger" here could be based on, e.g., the anticipated SINR changes after the beamforming has been updated. Various other predetermined minor and larger adjustments could be predefined by the NW. One example may be that the UE beamforming adjustment is allowed as long as a BRSRP for at least one of the BRSs in the restricted set is above a predetermined threshold. This threshold could be an absolute value (e.g., signaled from the NW), or it could be given as an offset relative to other BRSRP (e.g., relative to an earlier BRSRP measurement or BRSRP report).

Updating the Limits of the UE Beamforming Adjustments

In a further embodiment, a UE that wants to apply use of beams outside the allowed set can transmit a signal in such beams outside the set. The transmission can be contention-based using a random-access preamble or a contention-based scheduling request. In one embodiment the transmission is contention-free such that the network assigns the UE with a dedicated radio resource or signal sequence to use in the transmission. The network will search through multiple base station reception beams, potentially using multiple base stations. The NW can then detect whether a certain UE has a useful link to another base station, not currently assigned as the serving base station for that UE. This is useful for load balancing, as the UE beamforming gives additional choices to the network for the UE-to-base-station association.

Autonomous Update Based on Time

In this embodiment, the UE is allowed to change the BRS used to update the UE beam after a minimum predetermined time period. This introduces some inertia in the reference signal selection used for UE beam selection. A timer can be used, such that the UE cannot change the BRS reference used for UE beam selection until the timer has expired. When the timer expires, the timer is reset, the BRS reference may be changed, and a new time period commences.

Alternatively, the BRS reference used for UE beam selection may be updated based on some other event, which may occur periodically, as would be apparent to one of ordinary skill in the art and within the scope of the present disclosure.

As a result of the foregoing embodiments, it is possible to restrict the freedom of the UE when it comes to adapting its receive beams towards different BRS/transmit beams. The restrictions can be in terms of to what allowable transmit beams to adjust, how quickly the change may take place, and within what power-difference range the change may be applied, etc. This gives the network better opportunities to make sure the UE beamforming and the utilized downlink (DL) beam(s) are in agreement to provide the best possible SINR. This is particularly applicable in situations when the UE beam direction tends to change abruptly as, for example, in a handover situation between different eNBs.

FIG. 3 illustrates one example of a cellular communications network 10 according to some embodiments of the present disclosure. In the embodiments described herein, the cellular communications network 10 is an LTE network in which some or all of the radio access nodes operate on a carrier(s) in an unlicensed spectrum, e.g., the 5 gigahertz (GHz) spectrum; however, the present disclosure is not limited thereto. For example, the cellular communications network 10 may implement LAA, LTE-U, MulteFire, or some other technology in which radio access nodes operate on an unlicensed carriers(s). In this example, the cellular communications network 10 includes base stations 12-1 and 12-2, which in LTE are referred to as eNBs, controlling corresponding macro cells 14-1 and 14-2. The base stations 12-1 and 12-2 are generally referred to herein collectively as base stations 12 and individually as base station 12. Likewise, the macro cells 14-1 and 14-2 are generally referred to herein collectively as macro cells 14 and individually as macro cell 14. The cellular communications network 10 also includes a number of low power nodes 16-1 through 16-4 controlling corresponding small cells 18-1 through 18-4. In LTE, the low power nodes 16-1 through 16-4 can be small base stations (such as pico or femto base stations) or Remote Radio Heads (RRHs), or the like. Notably, while not illustrated, one or more of the small cells 18-1 through 18-4 may alternatively be provided by the base stations 12. The low power nodes 16-1 through 16-4 are generally referred to herein collectively as low power nodes 16 and individually as low power node 16. Likewise, the small cells 18-1 through 18-4 are generally referred to herein collectively as small cells 18 and individually as small cell 18. The base stations 12 (and optionally the low power nodes 16) are connected to a core network 20.

The base stations 12 and the low power nodes 16 provide service to wireless devices 22-1 through 22-5 in the corresponding cells 14 and 18. The wireless devices 22-1 through 22-5 are generally referred to herein collectively as wireless devices 22 and individually as wireless device 22. In LTE, the wireless devices 22 are referred to as UEs.

In this example, the macro cells 14 are provided in either a licensed frequency spectrum (i.e., in the frequency spectrum dedicated for the cellular communications network 10), e.g., for LAA operation or an unlicensed frequency spectrum, e.g., for LAA in the unlicensed spectrum (LAA-U) or MulteFire operation. In this example, one or more (and possibly all) of the small cells 18 are provided in an unlicensed frequency spectrum (e.g., the 5 GHz frequency spectrum).

In this particular example, the base stations 12, 14 that operate on a carrier(s) in an unlicensed spectrum operate to perform LBT and transmit MBMS data according to any of the embodiments described herein.

Figure 4:
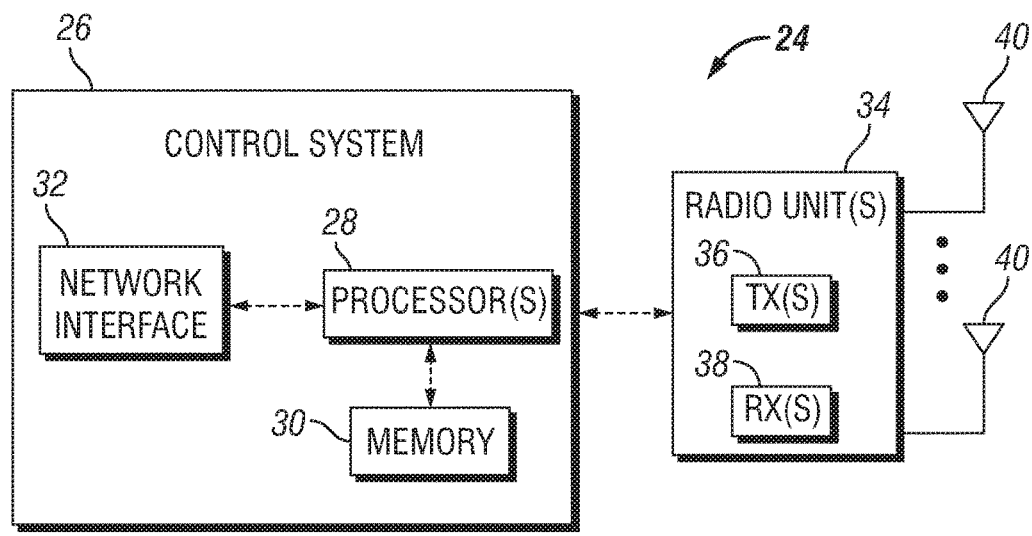
FIG. 4 is an exemplary block diagram of a radio access node, according to various exemplary embodiments.

FIG. 4 is a schematic block diagram of radio access node 24 according to some embodiments of the present disclosure. The radio access node 24 may be, for example, a base station 12, 16. As illustrated, the radio access node 24 includes a control system 26 that includes one or more processors 28 (e.g., Central Processing Units (CPUs), Application Specific Integrated Circuits (ASICs), Field Programmable Gate Arrays (FPGAs), and/or the like), memory 30, and a network interface 32. In addition, the radio access node 24 includes one or more radio units 34 that each includes one or more transmitters 36 and one or more receivers 38 coupled to one or more antennas 40. In some embodiments, the radio unit(s) 34 is external to the control system 26 and connected to the control system 26 via, e.g., a wired connection (e.g., an optical cable). However, in some other embodiments, the radio unit(s) 34 and potentially the antenna(s) 40 are integrated together with the control system 26. The one or more processors 28 operate to provide one or more functions of a radio access node 24 as described herein. In some embodiments, the function(s) are implemented in software that is stored, e.g., in the memory 30 and executed by the one or more processors 28.

Figure 6:
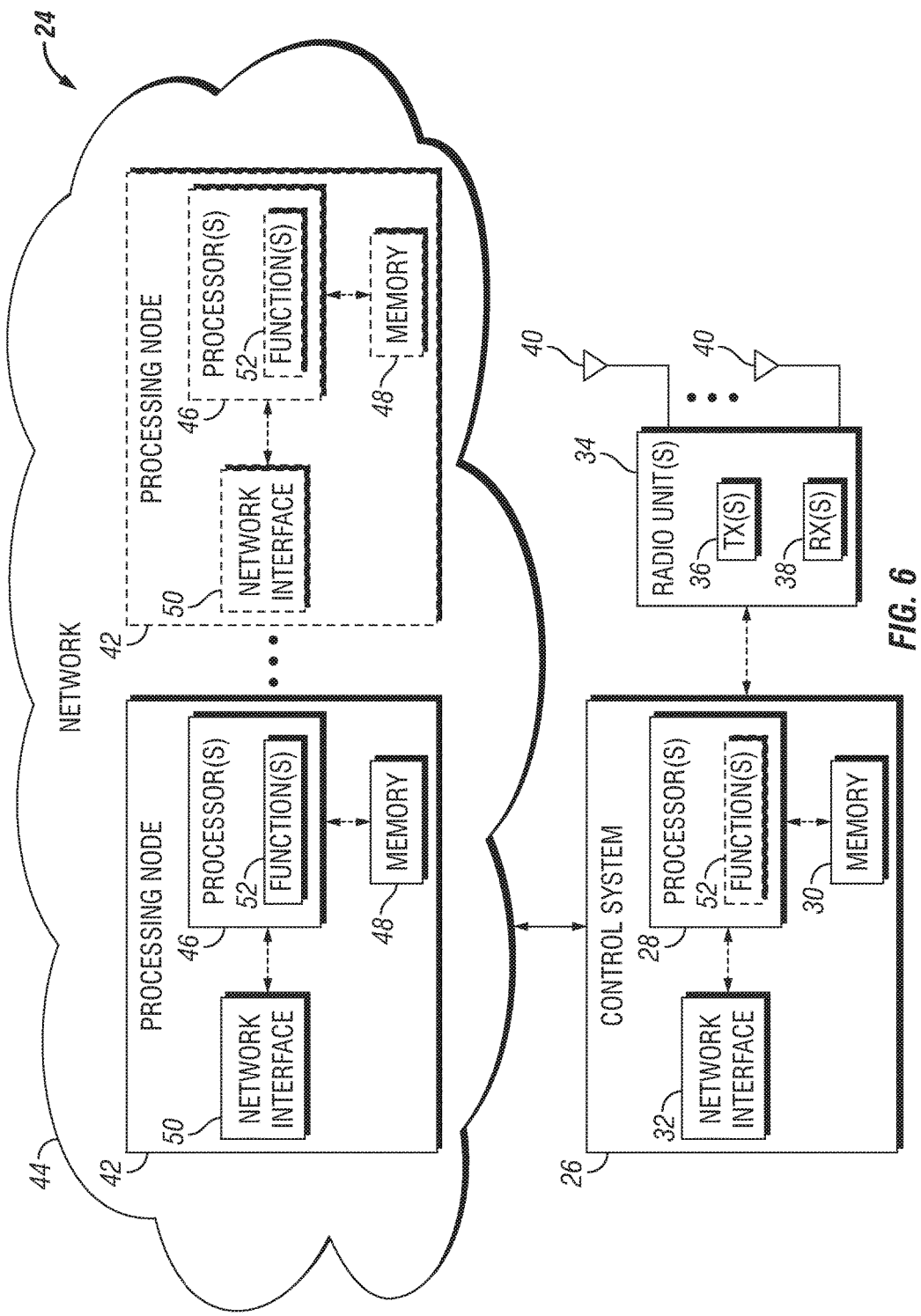
FIG. 6 is a diagram of an exemplary virtualized radio access node, according to various embodiments described herein.

FIG. 6 is a schematic block diagram that illustrates a virtualized embodiment of the radio access node 24 according to some embodiments of the present disclosure. This discussion is equally applicable to other types of network nodes. Further, other types of network nodes may have similar virtualized architectures.

As used herein, a "virtualized" radio access node is an implementation of the radio access node 24 in which at least a portion of the functionality of the radio access node 24 is implemented as a virtual component(s) (e.g., via a virtual machine(s) executing on a physical processing node(s) in a network(s)). As illustrated, in this example, the radio access node 24 includes the control system 26 that includes the one or more processors 28 (e.g., CPUs, ASICs, FPGAs, and/or the like), the memory 30, and the network interface 32 and the one or more radio units 34 that each includes the one or more transmitters 36 and the one or more receivers 38 coupled to the one or more antennas 40, as described above. The control system 26 is connected to the radio unit(s) 34 via, for example, an optical cable or the like. The control system 26 is connected to one or more processing nodes 42 coupled to or included as part of a network(s) 44 via the network interface 32. Each processing node 42 includes one or more processors 46 (e.g., CPUs, ASICs, FPGAs, and/or the like), memory 48, and a network interface 50.

In this example, functions 52 of the radio access node 24 described herein are implemented at the one or more processing nodes 42 or distributed across the control system 26 and the one or more processing nodes 42 in any desired manner. In some particular embodiments, some or all of the functions 52 of the radio access node 24 described herein are implemented as virtual components executed by one or more virtual machines implemented in a virtual environment(s) hosted by the processing node(s) 42. As will be appreciated by one of ordinary skill in the art, additional signaling or communication between the processing node(s) 42 and the control system 26 is used in order to carry out at least some of the desired functions 52. Notably, in some embodiments, the control system 26 may not be included, in which case the radio unit(s) 34 communicate directly with the processing node(s) 42 via an appropriate network interface(s).

In some embodiments, a computer program including instructions which, when executed by at least one processor, causes the at least one processor to carry out the functionality of radio access node 24 or a node (e.g., a processing node 42) implementing one or more of the functions 52 of the radio access node 24 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 5:
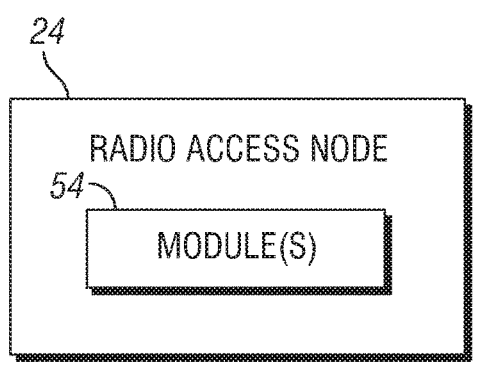
FIG. 5 is an exemplary block diagram of an embodiment of a radio access node, according to various embodiments.

FIG. 5 is a schematic block diagram of the radio access node 24 according to some other embodiments of the present disclosure. The radio access node 24 includes one or more modules 54, each of which is implemented in software. The module(s) 54 provide the functionality of the radio access node 24 described herein. This discussion is equally applicable to the processing node 42 of FIG. 6 where the modules 54 may be implemented at one of the processing nodes 42 or distributed across multiple processing nodes 42 and/or distributed across the processing node(s) 42 and the control system 26.

Figure 7:
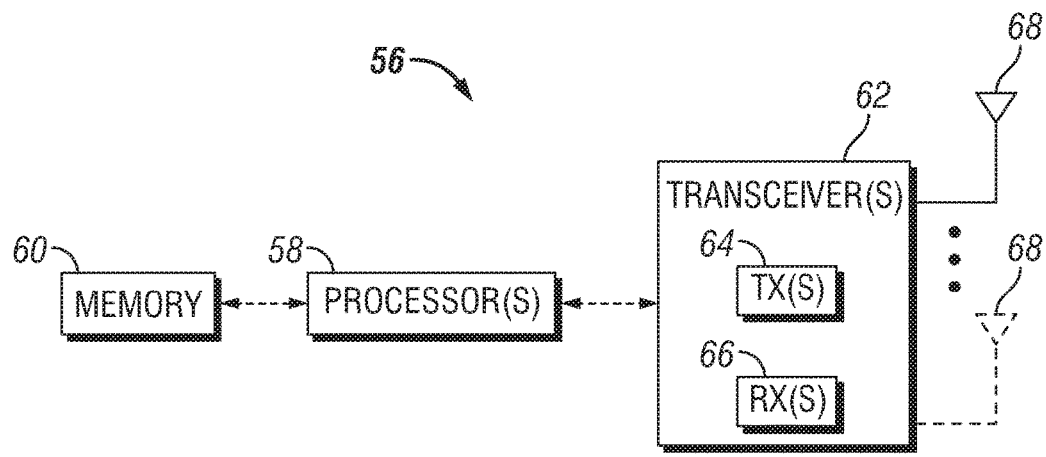
FIG. 7 is a block diagram of exemplary user equipment, according to various embodiments described herein.

FIG. 7 is a schematic block diagram of a UE 56 according to some embodiments of the present disclosure. As illustrated, the UE 56 includes one or more processors 58 (e.g., CPUs, ASICs, FPGAs, and/or the like), memory 60, and one or more transceivers 62 each including one or more transmitters 64 and one or more receivers 66 coupled to one or more antennas 68. In some embodiments, the functionality of the UE 56 described above may be fully or partially implemented in software that is, e.g., stored in the memory 60 and executed by the processor(s) 58.

In some embodiments, a computer program including instructions which, when executed by at least one processor, causes the at least one processor to carry out the functionality of the UE 56 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
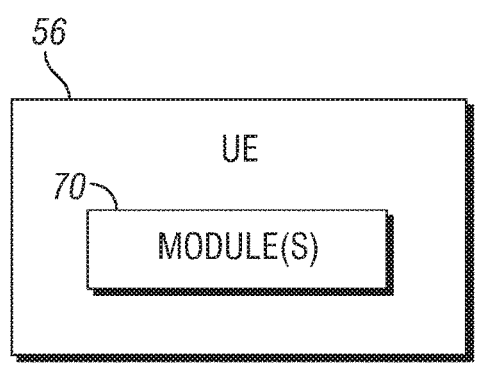
FIG. 8 is a block diagram of exemplary user equipment, according to various embodiments described herein.

FIG. 8 is a schematic block diagram of the UE 56 according to some other embodiments of the present disclosure. The UE 56 includes one or more modules 70, each of which is implemented in software. The module(s) 70 provide the functionality of the UE 56 described herein.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Those skilled in the art will recognize improvements and modifications to the embodiments of the present disclosure. All such improvements and modifications are considered within the scope of the concepts disclosed herein.

ABBREVIATIONS

5G Fifth-generation mobile radio access
BRS Beam Reference Signal
BRSRP BRS Received Power
CSI-RS Channel-State Information Reference Signal
DMRS Demodulation Reference Signal
DRS Discovery Reference Signal
MIMO Multiple Input Multiple Output
NW Network
RBS Radio Base Station
Rx Reception
SINR Signal to Interference and Noise Ratio
TP Transmission Point
Tx Transmission
UE User Equipment

What is claimed is:

1. A method for controlling user equipment (UE) beamforming in a wireless network, comprising:
   receiving one or more beam reference signals included in a restricted set of useable beam reference signals for adjusting the UE beamforming;
   receiving one or more beam reference signals outside of the restricted set;
   determining whether to update the restricted set to include a subset of the one or more beam reference signals outside of the restricted set, based on predetermined criteria;
   adjusting the beamforming based on beam reference signals in the restricted set; and
   sending an indication of one or more measurement results to a network node, including measurement results of at least a subset of the one or more beam reference signals outside of the restricted set.

2. The method of claim 1, further comprising:
   receiving an indication that the restricted set should be updated to include the subset of the one or more beam reference signals outside of the restricted set, based on the one or more measurement results; and,
   updating the restricted set to include the subset of the one or more beam reference signals.

3. The method of claim 1, further comprising updating the restricted set to include a subset of the one or more beam reference signals outside of the restricted set, when it is determined that the subset of beam reference signals outside the restricted set have a beam reference signal received power above a predetermined threshold.

4. The method of claim 1, wherein the one or more beam reference signals in the restricted set include all beam reference signals that are allocated to a serving base station.

5. The method of claim 1, wherein the one or more beam reference signals outside of the restricted set include beam reference signals associated with beams known to carry interference.

6. The method of claim 5, wherein the UE is explicitly informed by a network node which beam reference signals are associated with beams that carry interference beyond a predetermined threshold due to transmission aimed to other user equipment.

7. The method of claim 6, further comprising actively suppressing reception of data associated with beam reference signals that carry interference determined to be above a predetermined threshold.

8. The method of claim 1, wherein the one or more beam reference signals outside the restricted set include beam reference signals belonging to a base station having a load above a predetermined level.

9. The method of claim 1, wherein the one or more beam reference signals included in the restricted set include beam reference signals having a beam reference signal received power above a predetermined threshold.

10. The method of claim 9, wherein the UE refrains from adjusting the beamforming until a subsequent beam reference signal received power report is generated and a new beam reference signal is determined to be in the updated restricted set.

11. The method of claim 1, wherein the UE adjusts the beamforming for adjustments determined to be smaller than a predetermined threshold based on an anticipated performance of the adjusted beamforming after the beamforming has been updated.

12. The method of claim 11, wherein the anticipated performance is an anticipated signal-to-noise ratio change after the beamforming has been updated.

13. The method of claim 11, wherein the anticipated performance is a beam reference signal received power change after the beamforming has been updated.

14. The method of claim 1, further comprising:
refraining from adjusting the beamforming until a timer expires after a previous beamforming adjustment; and
restarting the timer.

15. A user equipment (UE) for controlling beamforming in a wireless network, comprising:
a receiver receiving one or more beam reference signals included in a restricted set of useable beam reference signals for adjusting the UE beamforming, and receiving one or more beam reference signals outside of the restricted set;
a processor determining whether to update the restricted set to include a subset of the one or more beam reference signals outside of the restricted set, based on predetermined criteria and controlling adjustment of the beamforming based on beam reference signals in the restricted set; and,
a transmitter transmitting an indication of one or more measurement results to a network node, including measurement results of at least a subset of the one or more beam reference signals outside of the restricted set.

16. The UE of claim 15, further comprising:
a receiver receiving an indication that the restricted set should be updated to include the subset of the one or more beam reference signals outside of the restricted set, based on the one or more measurement results; and
a memory storing an updated restricted set to include the subset of the one or more beam reference signals.

17. The UE of claim 15, further comprising updating the restricted set to include a subset of the one or more beam reference signals outside of the restricted set, when it is determined that the subset of beam reference signals outside the restricted set have a beam reference signal received power above a predetermined threshold.

18. The UE of claim 15, wherein the one or more beam reference signals in the restricted set include all beam reference signals that are allocated to a serving base station.

19. The UE of claim 15, wherein the one or more beam reference signals outside of the restricted set include beam reference signals associated with beams known to carry interference.

20. The UE of claim 19, wherein the UE is explicitly informed by a network node which beam reference signals are associated with beams that carry interference beyond a predetermined threshold due to transmission aimed to other user equipment.

21. A network node for controlling UE beamforming in a wireless network, comprising:
a receiver receiving a report message from the UE regarding one or more beam reference signals included in a restricted set of useable beam reference signals for adjusting the UE beamforming, and one or more beam reference signals outside of the restricted set;
a network interface receiving a determination whether to update the restricted set to include a subset of the one or more beam reference signals outside of the restricted set, based on predetermined criteria; and
a transmitter transmitting a signal indicating to the UE to update the restricted set and adjust the beamforming based on beam reference signals in the restricted set;
wherein the receiver receives an indication of one or more measurement results relating to a subset of the one or more beam reference signals outside of the restricted set for adjusting the UE beamforming.

22. The network node of claim 21, further comprising
a transmitter transmitting an indication to the UE to include the subset of the one or more beam reference signals outside of the restricted set, based on the one or more measurement results.

23. The network node of claim 21, further comprising causing the UE to update the restricted set to include a subset of the one or more beam reference signals outside of the restricted set, when it is determined that the subset of beam reference signals outside the restricted set have a beam reference signal received power above a predetermined threshold.

24. The network node of claim 21, wherein the one or more beam reference signals in the restricted set include all beam reference signals that are allocated to a serving base station.

25. The network node of claim 21, wherein the one or more beam reference signals outside of the restricted set include beam reference signals associated with beams known to carry interference.

26. The network node of claim 25, wherein the transmitter transmits an explicit message informing the UE which beam reference signals are associated with beams that carry interference beyond a predetermined threshold due to transmission aimed to other user equipment.

27. The network node of claim 21, wherein the one or more beam reference signals outside the restricted set include beam reference signals belonging to a base station having a load above a predetermined level.

28. The network node of claim 21, wherein the one or more beam reference signals included in the restricted set include beam reference signals having a beam reference signal received power above a predetermined threshold.

\* \* \* \* \*